US010883157B2

(12) United States Patent
Catovic

(10) Patent No.: US 10,883,157 B2
(45) Date of Patent: Jan. 5, 2021

(54) PROCESS FOR EXTRACTING AND RECOVERING LITHIUM VALUES FROM LITHIUM BEARING MATERIALS

(71) Applicant: Lithium Australia NL, Western Australia (AU)

(72) Inventor: Enej Catovic, Western Australia (AU)

(73) Assignee: Lithium Australia NL, Western Australia (AU)

(*) Notice: Subject to any disclaimer, the term of this patent is extended or adjusted under 35 U.S.C. 154(b) by 51 days.

(21) Appl. No.: 16/076,643

(22) PCT Filed: Feb. 9, 2017

(86) PCT No.: PCT/AU2017/050104
§ 371 (c)(1),
(2) Date: Aug. 8, 2018

(87) PCT Pub. No.: WO2017/136885
PCT Pub. Date: Aug. 17, 2017

(65) Prior Publication Data
US 2019/0048438 A1 Feb. 14, 2019

(30) Foreign Application Priority Data
Feb. 9, 2016 (AU) .................................. 2016900428

(51) Int. Cl.
*C22B 26/12* (2006.01)
*C22B 3/06* (2006.01)
(Continued)

(52) U.S. Cl.
CPC .............. *C22B 26/12* (2013.01); *C01D 15/08* (2013.01); *C22B 3/06* (2013.01); *C22B 3/44* (2013.01); *Y02P 10/20* (2015.11)

(58) Field of Classification Search
None
See application file for complete search history.

(56) References Cited

U.S. PATENT DOCUMENTS

| 4,159,308 A | 6/1979 | McLaughlin |
| 2015/0247216 A1 | 9/2015 | Wohlgemuth et al. |

FOREIGN PATENT DOCUMENTS

| CN | 102 417 995 A | 4/2012 |
| CN | 102417995 A * | 4/2012 |

(Continued)

OTHER PUBLICATIONS

Response to the Written Opinion issued by the Australian Patent Office regarding International Application PCT/AU2017/050104, dated Mar. 23, 2017, 10 pgs.

(Continued)

*Primary Examiner* — Melissa S Swain
(74) *Attorney, Agent, or Firm* — Haynes and Boone, LLP

(57) ABSTRACT

A process for recovering lithium from lithium-bearing materials, in particular lithium bearing silicates such as spodumene, is provided. The process involves the steps of mixing the lithium-bearing material with a source of fluoride, such as calcium fluoride or hydrogen fluoride, in the presence of sulphuric acid at 90° C. for ≥3 h to extract ≥80% Li. Lithium values may be recovered as >98% purity lithium carbonate by raising the pH of the pregnant liquor solution (PLS) to pH<4 to precipitate Al and fluoride from solution, with a subsequent softening step to bulk remove excess calcium sulphate, followed by evaporation and precipitation of lithium carbonate.

27 Claims, 1 Drawing Sheet

(51) Int. Cl.
    *C22B 3/44*    (2006.01)
    *C01D 15/08*   (2006.01)

(56)            References Cited

FOREIGN PATENT DOCUMENTS

CN      102 690 961  A      9/2012
WO    WO 2015/155684 A2    10/2015

OTHER PUBLICATIONS

Kuang, et al., Lithium Extraction Mechanism for a-Spodumene by Fluorine Chemical Method, Advanced Materials Research, 2012, vols. 524-527, pp. 2011-2016. Accessible online: May 2012.
International Preliminary Report on Patentability issued by the Australian Patent Office regarding International Application No. PCT/AU2017/050104, dated Jan. 8, 2018, 3 pgs.
International Search Report and Written Opinion issued by the Australian Patent Office regarding International Application No. PCT/AU2017/050104, dated Mar. 23, 2017, 10 pgs.
Extended European Search Report issued for European Application No. EP 17 74 9827, dated Jun. 28 2019, 6 pages.
Pratima Meshram et al., "Extraction of lithium from primary and secondary sources by pre-treatment, leaching and separation: A comprehensive review," Hydrometallurgy, vol. 150, Dec. 1, 2014, pp. 192-208, XP055589240, NL ISSN: 0304-386, DOI: 10.1016/j.hydromet.2014.10.012.

\* cited by examiner

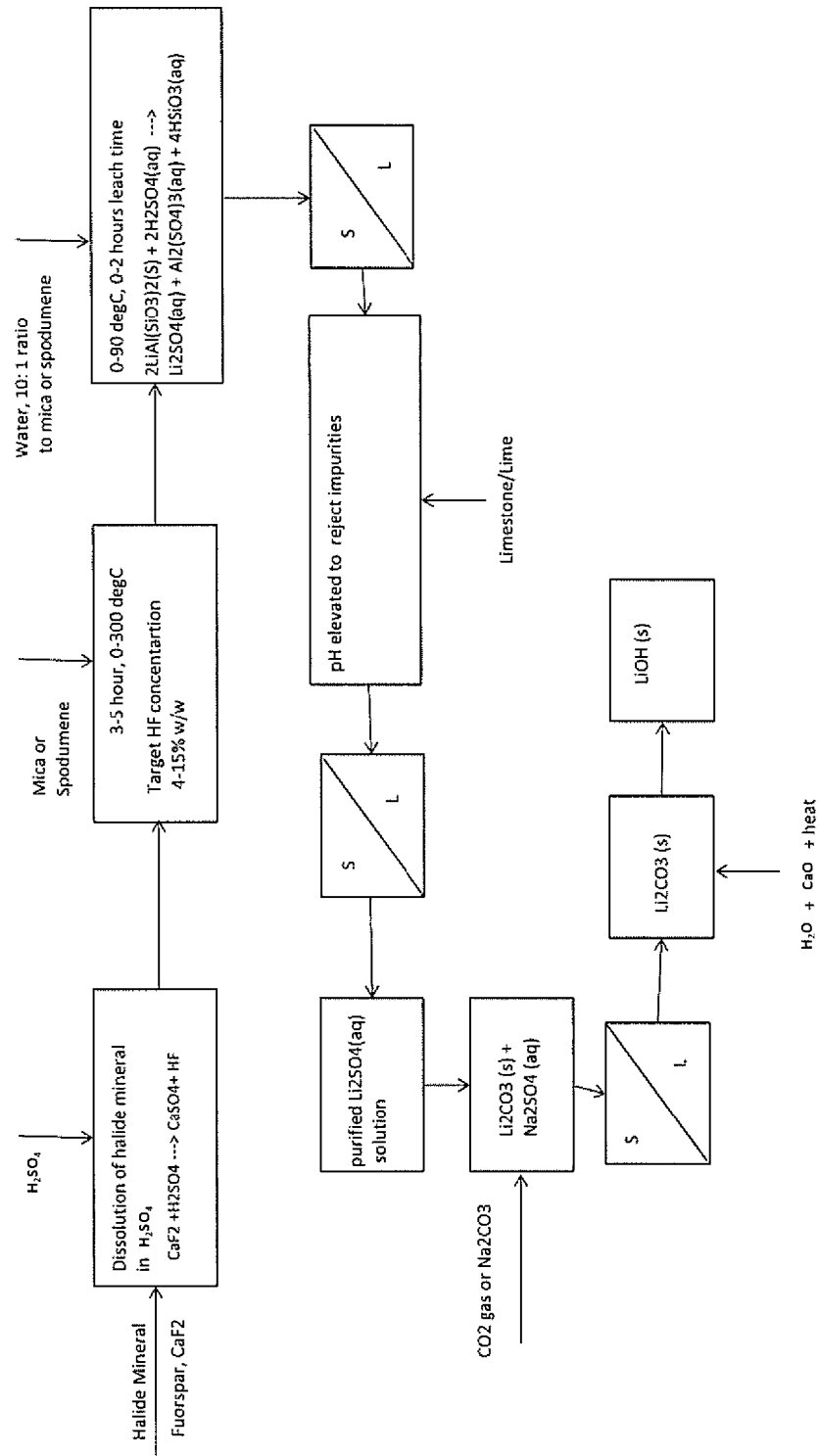

PROCESS FOR EXTRACTING AND RECOVERING LITHIUM VALUES FROM LITHIUM BEARING MATERIALS

FIELD

The present disclosure relates to processes for extracting and recovering lithium values from lithium bearing materials. In particular, the present disclosure relates to processes for extracting and recovering lithium values from lithium-bearing silicates including but not limited to pyroxenes (such as spodumene), the nepheline group (such as petalite), amphiboles (such as homquistite), tourmalines (such as elbaite), micas (such as lepidolite and zinnwaldite), chlorites, and smectites.

BACKGROUND

The following discussion of the background to the disclosure is intended to facilitate an understanding of the disclosure. However, it should be appreciated that the discussion is not an acknowledgement or admission that any of the material referred to was published, known or part of the common general knowledge as at the priority date of the application.

Global supply of lithium is currently sourced from brines or hard rock deposits.

In the former, lithium is concentrated as soluble salts by solar evaporation. Lithium produced from brines is generally of a low grade and, while the capital input for brine production is high, operating costs are low.

In the case of hard rock deposits conventional mining and beneficiation techniques are used to produce high grade spodumene concentrate. It is possible to obtain lithium chemicals of technical, battery grade (99.5%) or high-purity (>99.9%) lithium carbonate from various acid-roasting and lime-roasting processes.

The acid-roasting method involves firstly decrepitation (at 1070-1090° C.) to convert α-spodumene to the more reactive β-structure, followed by sulphation using sulphuric acid at 250° C. and leaching of the calcine at 90° C. to extract lithium into solution. The lime-roasting process, on the other hand, relies on the roasting of spodumene and lime at 1030-1040° C. before water-leaching the clinker produced to recover lithium. Other routes used to extract lithium from spodumene via pressure leaching with soda ash or chlorination roasting have also been proposed.

All of these processes involve a roasting step with significant reagent consumption prior to leaching. The high energy cost associated with roasting low-grade lithium concentrates has proven uneconomic.

There is therefore a need for alternative or improved processes to recover lithium from silicate materials.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

SUMMARY

The present disclosure provides a process for extracting lithium values from a lithium-bearing material, in particular from lithium-bearing silicates such as spodumene. The present disclosure also provides a process for recovering lithium values from lithium-bearing silicates, in particular as lithium carbonates.

The process for extracting lithium values from a lithium-bearing material comprises the steps of:

a) heating a slurry of a lithium-bearing material, a source of fluoride and sulphuric acid at a temperature from 70° C. up to a boiling point of the slurry; and, b) washing the slurry with water or a dilute acid solution and separating solids therefrom to produce a lithium-bearing solution (LBS).

In various embodiments maximum Li extraction achieved by the process may be >85%. In some embodiments maximum Li extraction may be >90%, >95%, or even >98%.

In one particular embodiment, the lithium-bearing material may be a lithium-bearing silicate.

In various embodiments, the slurry may have a solids density in a range of 15-50 wt %. In one embodiment the slurry may have a solids density in a range of 20-25 wt %.

In one embodiment, the source of fluoride may be a fluoride salt or hydrofluoric acid. In an alternative embodiment, the source of fluoride may be a fluoride-bearing substance which generates hydrofluoric acid in situ by reaction with sulphuric acid. Such fluoride-bearing substances include naturally occurring minerals with fluoride as a major anion in its crystal lattice.

The source of fluoride may be present in the slurry in an amount sufficient to ensure maximum Li extraction. In one embodiment, the slurry comprises 90-1000 kg/t (HF eq.) of the source of fluoride. Depending on the mineralogy of the lithium-bearing material, in some embodiments the slurry may comprise a low concentration of the source of fluoride in a range of 40-180 kg/t (HF eq.). In other embodiments, the slurry may comprise a high concentration of the source of fluoride in a range of 500 to 2000 kg/t (HF eq.).

Sulphuric acid is present in the slurry to generate hydrofluoric acid in situ, in particular when fluoride-bearing substances are employed as the source of fluoride. Sulphuric acid may be present in the slurry in an amount sufficient to ensure maximum Li extraction. In some embodiments, sulphuric acid is present as free acid at a concentration of 50-1000 kg/t. Depending on the mineralogy of the lithium-bearing material, in some embodiments the slurry may comprise a low concentration of sulphuric acid in a range of 50-100 kg/t sulphuric acid. In other embodiments, the slurry may comprise a high concentration of sulphuric acid in a range of 500 to 5000 kg/t.

In one embodiment, wherein the lithium-bearing material comprises a lithium-bearing mica such as lepidolite, the slurry may comprise the source of fluoride in an amount of 90-180 kg/t (HF eq.) and sulphuric acid in an amount of 50-300 kg/t.

In an alternative embodiment, wherein the lithium-bearing material comprises spodumene, the slurry comprises the source of fluoride in a range of 500-2000 kg/t (HF eq.) and sulphuric acid in a range of 1000-5000 kg/t sulphuric acid In one embodiment the slurry may be heated to about 90° C. It will be appreciated by those skilled in the art that the slurry may be heated to a temperature above its boiling point up to 350° C. to increase the kinetics of the reaction between hydrofluoric acid (optionally generated in situ) and the lithium-bearing material.

In another embodiment step a) may be performed for a period from 3 h to 24 h, in particular 4 h to 8 h.

The process may achieve Li extraction from the lithium-bearing material of >85%. In particular embodiments, Li extraction from the lithium-bearing material may be >90%, >95%, or even >98%.

Lithium values may be recovered from the lithium-bearing solution as lithium carbonate or lithium hydroxide.

Accordingly, in a second aspect of the disclosure there is provided a process for recovering lithium values from a lithium-bearing material comprising the steps of:
a) extracting lithium values from the lithium-bearing material to produce a lithium-bearing solution (LBS) according to the steps defined in the first aspect of the disclosure;
b) removing one or more impurities from the LBS; and,
c) evaporating the LBS produced in step b) to precipitate lithium carbonate.

In one embodiment, the step of removing one or more impurities from the LBS comprises raising the pH of the LBS to 3.5-4.0 to deplete the LBS of fluoride and subsequently raising the pH of the fluoride-depleted LBS to 10.5-11.0 to precipitate one or more remaining impurities therefrom. The precipitates may be separated from the LBS using conventional techniques.

In one particular embodiment, the concentration of fluoride in the LBS may be reduced to about 2 g/L before raising the pH of the fluoride-depleted LBS to 10.5-11.0.

In some embodiments raising the pH comprises adding a source of carbonate to the LBS. In particular; the source of carbonate may be an alkali metal carbonate salt such as sodium carbonate, potassium carbonate or lithium carbonate or an alkaline earth metal carbonate salt such as calcium carbonate or magnesium carbonate. Alternatively, an alkali metal hydroxide or an alkaline earth metal hydroxide may be added to the LBS while passing carbon dioxide through the LBS, thereby adding carbonate to the LBS.

It will be appreciated that Si may be present in the LBS in the form of one or more soluble silicate and metal-silicate complexes. In one particular embodiment, wherein the lithium-bearing material comprises spodumene, adding sodium carbonate removes fluoride and Si from the LBS as a sodium hexafluorosilicate precipitate.

It will also be appreciated that Al may be present in the LBS in the form of one or more soluble aluminium fluoride complexes. In one particular embodiment, raising the pH removes Al from the LBS as a precipitate of sodium aluminium hexafluoride or one or more insoluble aluminium fluoride complexes.

In a further embodiment, one or more of the sodium hexafluorosilicate, sodium aluminium hexafluoride, or aluminium fluoride complex precipitates may be separated from the LBS and recycled for use as a source of fluoride in step a) of the process for extracting lithium from a lithium-bearing material.

In one embodiment, step c) comprises evaporating the fluoride-depleted LBS produced in step b) until a Li concentration in a range of about 2.8-10 g/L is achieved.

In one embodiment, prior to performing step c), the process further comprises the step of softening the LBS from step b). Softening may comprise adding a stoichiometric amount of sodium carbonate to bulk remove calcium as calcium sulphate.

Additionally, the process further comprises removal of potassium sulphate and/or sodium sulphate from the fluoride-depleted LBS prior to performing step c). In some embodiments, potassium sulphate and/or sodium sulphate may be precipitated from the fluoride-depleted LBS by cooling to 8° C.

In another aspect the disclosure provides a process for recovery of lithium values as lithium hydroxide, the process comprising the steps of:
a) recovering lithium values from a lithium-bearing material according to the steps defined in the first and second aspects of the disclosure;
b) dissolving separated lithium carbonate in water or an aqueous solution to produce a lithium carbonate solution, adding lime to the lithium carbonate solution; and
c) precipitating lithium hydroxide by evaporation.

In another aspect of the disclosure, there is provided a process for recovering lithium values from a lithium-bearing material comprising the steps of:
a) mixing the lithium-bearing material with a halide lixiviant in the presence of sulphuric acid;
b) heating the mixture to a temperature up to the boiling point of the mixture at atmospheric pressure; and
c) leaching the heated mixture with water to form a lithium-bearing solution.

BRIEF DESCRIPTION OF THE FIGURES

Notwithstanding any other forms which may fall within the scope of the process as set forth in the Summary, specific embodiments will now be described, by way of example only, with reference to the accompanying FIGURES in which:

FIG. 1 is a process flow sheet depicting a process for recovery of lithium from lithium bearing silicates.

DESCRIPTION OF EMBODIMENTS

The disclosure relates to a process for recovering lithium values from lithium-bearing materials. In particular, the present disclosure relates to a process for recovering lithium values from lithium-bearing silicates such as spodumene.

General Terms

Throughout this specification, unless specifically stated otherwise or the context requires otherwise, reference to a single step, composition of matter, group of steps or group of compositions of matter shall be taken to encompass one and a plurality (i.e. one or more) of those steps, compositions of matter, groups of steps or groups of compositions of matter. Thus, as used herein, the singular forms "a", "an" and "the" include plural aspects unless the context clearly dictates otherwise. For example, reference to "a" includes a single as well as two or more; reference to "an" includes a single as well as two or more; reference to "the" includes a single as well as two or more and so forth.

Each example of the present disclosure described herein is to be applied mutatis mutandis to each and every other example unless specifically stated otherwise. The present disclosure is not to be limited in scope by the specific examples described herein, which are intended for the purpose of exemplification only. Functionally-equivalent products, compositions and methods are clearly within the scope of the disclosure as described herein.

The term "and/or", e.g., "X and/or Y" shall be understood to mean either "X and Y" or "X or Y" and shall be taken to provide explicit support for both meanings or for either meaning.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the present specification, including definitions, will control. In addition, the materials, methods, and examples are illustrative only and not intended to be limiting.

Specific Terms

The term "lithium-bearing material" as used herein refers to any lithium containing substance. The term may be used predominantly to refer to naturally occurring minerals that contain lithium values, including but not limited to silicates, fluorophosphates, boro-silicates, aluminium silicates, phosphates such as amblygonite, lithium-containing micas, and lithium-containing clays.

It will be appreciated by those skilled in the art that the lithium-bearing material may comprise one or more naturally occurring lithium minerals because they frequently occur together, for example in pegmatite bodies. Several metals, such as Mn, Rb and Cs, and other minerals such as quartz, albite, feldspar, topaz and beryl may also be associated with these lithium minerals. Accordingly, the term "lithium-bearing material" encompasses high grade ores and concentrates as well as medium to low grade ores, concentrates and blends thereof.

The term "lithium bearing silicate" as used herein refers to a concentrate, ore, or tailings derived from one or more silicate minerals containing lithium values. Exemplary lithium bearing silicates include, but are not limited to, jadarite, spodumene and other pyroxenes, trilithionite, petalite and other lithium-bearing silicates from the nepheline group of minerals, holmquistite and other lithium-bearing silicates from the amphibole group of minerals, lepidolite, zinwaldite, elbaite and other tourmalines, chlorites, smectites, lithium-containing micas, and lithium-containing clays.

The term 'HF eq.' as used herein refers to an amount of the source of fluoride, other than hydrofluoric acid (HF), which would provide an equivalent amount of HF when converted to the free acid form by reaction with a mineral acid such as sulphuric acid.

A reference to 'g/kg' or 'kg/t' throughout the specification refers to the mass of a substance per kilogram or tonne, respectively, of the lithium-bearing material.

The term 'boiling point" is used to refer to the temperature at which a liquid or slurry boils under the particular pressure to which it is being subjected. It will be appreciated that the boiling point may also vary according to the various solutes in the liquid or slurry and their concentration.

Process for Extracting Lithium Values

The process for extracting lithium values from lithium-bearing materials, as described herein, is particularly suited to lithium bearing silicates. Lithium extraction achieved by the process may be >85%, >90%, >95%, or even >98%.

Prior to undergoing the processes described herein, the lithium-bearing material may be ground and milled to $P_{100}$<150 µm. In certain embodiments the lithium-bearing material may have a particle size with $P_{80}$ in a range of 20-110 µm, 38-106 µm, or in the range of 20-50 µm. The lithium-bearing material may be ground and milled to the desired particle size by conventional techniques well known in the art in a dry milling process or a wet milling process.

The process for extracting lithium values from a lithium-bearing material comprises the steps of:
a) heating a slurry of a lithium-bearing material, a source of fluoride and sulphuric acid to a temperature from 70° C. up to a boiling point of the slurry; and,
b) washing the slurry with water or a dilute acid solution and separating solids therefrom to produce a lithium-bearing solution (LBS).

The source of fluoride may be first mixed with the sulphuric acid to liberate free fluoride anions and heated to the desired reaction temperature before mixing with the lithium-bearing material.

Alternatively, the lithium bearing material may be first mixed with the source of fluoride, in particular hydrofluoric acid, followed by addition of sulphuric acid.

The resulting slurry may be stirred or mechanically agitated during the heating step.

When the lithium-bearing material is mixed with the source of fluoride in the presence of sulphuric acid, there may be autogenous generation of additional fluoride as the lithium-bearing material is progressively dissolved. For example, the dissolution of lithium-bearing micas when mixed with the hydrofluoric acid or calcium fluoride in the presence of sulphuric acid releases additional fluoride ions from the crystal structure of the mica into the reaction mixture. The resulting increase in fluoride concentration in situ increases the rate of dissolution of the lithium-bearing material. Advantageously, the effect of the increased rate of dissolution decreases the residence time in comparison to other hydrometallurgical processes, leading to development of a plant design having a reduced footprint and lower capital cost.

The slurry may be heated for a period of time sufficient to achieve a particular level of extraction of lithium values. The time required for the extraction depends upon the mineralogy and particle size of the lithium-bearing material, the concentration of the source of fluoride, the concentration of sulphuric acid, the solids density of the slurry, and the temperature at which the slurry is heated.

It will be appreciated by those skilled in the art that, other things being equal, the higher the temperature, the shorter the reaction time to achieve the desired level of extraction. For example, the extraction of lithium may be accelerated by heating the slurry to the boiling point of the slurry at atmospheric pressure. Typically, however, the temperature of the slurry is maintained at about 90° C.

Generally, the slurry is heated for a period from 3 h to 24 h, in particular 4 h to 10 h.

The process may be carried out in either a batch mode or a continuous mode. The particular choice of operation will depend upon a residence time necessary to extract the desired amount of lithium values.

In various embodiments, the slurry may have a solids density in a range of 15-50 wt %. In one embodiment the slurry may have a solids density in a range of 20-25 wt %.

The source of fluoride may be a fluoride salt, in particular an alkali metal fluoride salt or an alkaline earth metal fluoride salt, or hydrofluoric acid. Illustrative examples of suitable fluoride salts include sodium fluoride and calcium fluoride.

Alternatively, the source of fluoride may be a fluoride-bearing substance which generates hydrofluoric acid by reaction with sulphuric acid. Such fluoride-bearing substances include naturally occurring minerals with fluoride as a major anion in its crystal lattice, aluminium hexafluoride, sodium hexafluorosilicates, or other mixed aluminium fluoride or fluorosilicate complexes. It will be appreciated that any fluoride-containing precipitate separated from the LBS to produce the fluoride-depleted LBS may be used as a source of fluoride in step a) of the process for extracting lithium as described herein.

The source of fluoride may be present in the slurry in an amount sufficient to ensure maximum Li extraction. In one embodiment, the slurry comprises 90-1000 kg/t (HF eq.) of the source of fluoride. Depending on the mineralogy of the lithium-bearing material, in some embodiments the slurry may comprise a low concentration of the source of fluoride in a range of 40-180 kg/t (HF eq.). For example, a low concentration of the source of fluoride may be suitable for lithium-bearing materials having a crystal lattice structure with fluoride as a major anion. In other embodiments, the slurry may comprise a high concentration of the source of fluoride in a range of 500 to 2000 kg/t (HF eq.). A high concentration of the source of fluoride may be required to extract lithium values from otherwise intractable lithium silicates such as spodumene.

Sulphuric acid is present in the slurry to generate hydrofluoric acid, in particular when fluoride-bearing substances are employed as the source of fluoride. Sulphuric acid may be present in the slurry in an amount sufficient to ensure maximum Li extraction. Sulphuric acid may be present as free acid at a concentration of 50-1000 kg/t. Depending on the mineralogy of the lithium-bearing material, in some embodiments the slurry may comprise a low concentration of sulphuric acid in a range of 50-100 kg/t sulphuric acid. For example, a low concentration of sulphuric acid may be suitable for lithium-bearing materials having a crystal lattice structure with fluoride as a major anion. In other embodiments, the slurry may comprise a high concentration of sulphuric acid in a range of 500 to 5000 kg/t. A high concentration of sulphuric acid may be required to extract lithium values from otherwise intractable lithium silicates such as spodumene.

In one embodiment, wherein the lithium-bearing material comprises a lithium-bearing mica such as lepidolite, the slurry may comprise source of fluoride in an amount of 90-180 kg/t (HF eq.) and sulphuric acid in an amount of 50-300 kg/t.

In an alternative embodiment, wherein the lithium-bearing material comprises spodumene, the slurry comprises source of fluoride in a range of 500-2000 kg/t (HF eq.) and sulphuric acid in a range of 1000-5000 kg/t sulphuric acid The heated slurry may then be leached with water or a dilute acid solution to solubilise extracted metal values, in particular lithium values. Leaching with water is achieved by mixing the heated slurry with water in a ratio of water: lithium-bearing material of up to 10:1. Typically, the leaching step may be performed for 1 h. The dilute acid solution may have a concentration from about 0.005-1.0 M.

Solids may be removed from the diluted slurry to yield a lithium-bearing solution (LBS) by any suitable conventional technique such as filtration, centrifugation, decantation and so forth.

Process for Recovering Lithium Values

After extracting the lithium values from the lithium-bearing material as described in the foregoing paragraphs, lithium values may be subsequently recovered from the lithium-bearing solution as lithium carbonate or lithium hydroxide.

It will be appreciated by the person skilled in the field, that one or more impurities may be co-dissolved into the lithium-bearing solution. The term "impurities" as used herein refers to a metal value, other than lithium, contained in the lithium-bearing material which is capable of dissolving in the lithium-bearing solution under the same process conditions. Examples of typical metal values, other than lithium, include but are not limited to K, Na, Cs, Rb, Si, Al and Fe.

Prior to recovering the lithium values from the lithium-bearing solutions in the form of lithium carbonate or lithium hydroxide, the one or more impurities may be removed.

Removing one or more impurities from the LBS comprises raising the pH of the LBS to 3.5-4.0 to deplete the LBS of fluoride and subsequently raising the pH of the fluoride-depleted LBS to 10.5-11.0 to precipitate one or more remaining impurities therefrom. The concentration of fluoride in the LBS may be reduced to about 2 g/L before raising the pH of the fluoride-depleted LBS to 10.5-11.0. Reducing the concentration of fluoride in the LBS prior to raising the pH of the LBS to 10.5-11.0 significantly reduces the degree of co-precipitation of lithium salts together with the impurities at higher pH and concomitant reduction in lithium value recovery.

Typically, the one or more impurities are precipitated as either metal salts or their respective metal hydroxides. The precipitates may be separated from the LBS using conventional techniques such as filtration, centrifugation, gravity separation, decantation and so forth.

Raising the pH may comprise adding a source of carbonate to the LBS. In particular; the source of carbonate may be an alkali metal carbonate salt such as sodium carbonate, potassium carbonate or lithium carbonate or an alkaline earth metal carbonate salt such as calcium carbonate or magnesium carbonate. Alternatively, an alkali metal hydroxide or an alkaline earth metal hydroxide may be added to the LBS while passing carbon dioxide through the LBS, thereby adding the source of carbonate to the LBS.

Advantageously, addition of carbonate to the LBS not only elevates the pH but provides a carbonate counter-anion for production of lithium carbonate.

In one particular embodiment, wherein the lithium-bearing material comprises spodumene, adding sodium carbonate removes fluoride and Si from the LBS as a sodium hexafluorosilicate precipitate.

It will also be appreciated that Al may be present in the LBS in the form of one or more soluble aluminium fluoride complexes. In one particular embodiment, raising pH removes Al from the LBS as a precipitate of sodium aluminium hexafluoride or one or more insoluble aluminium fluoride complexes.

The one or more separated impurities may be converted into one or more valuable byproducts. Alternatively, the one or more separated impurities may undergo further purification processes to recover valuable byproducts. Common byproducts may include, but are not limited to, potassium sulphate, sodium sulphate, aluminium fluoride.

In a further embodiment, one or more of the sodium hexafluorosilicate, sodium aluminium hexafluoride, or aluminium fluoride complex precipitates may be separated from the LBS and recycled for use as a source of fluoride in step a) of the process for extracting lithium from a lithium-bearing material.

It will be appreciated that after removal of the one or more impurities from the lithium-bearing solution that the lithium-bearing solution may undergo further purification processes, if required, such as by using ion exchange, membrane filtration, electrodialysis, and so forth.

After removal of the one or more impurities, the fluoride-depleted LBS may undergo a softening step. Softening may comprise adding a stoichiometric amount of sodium carbonate to bulk remove calcium as calcium sulphate. This intermediate softening step may be required in embodiments where the source of fluoride comprises calcium fluoride or calcium carbonate or lime has been employed to raise the pH of the LBS.

Additionally, the process may further comprise removal of potassium sulphate or sodium sulphate from the fluoride-depleted LBS prior to recovering lithium carbonate In some embodiments, potassium sulphate may be precipitated from the fluoride-depleted LBS by cooling the fluoride-depleted LBS to 8° C.

Recovering lithium values as lithium carbonate may comprise evaporating the fluoride-depleted LBS produced from which one or more impurities have been removed until a Li concentration in a range of about 2.8-10 g/L is achieved. Generally, the fluoride-depleted LBS is heated to 95° C. with addition of sodium carbonate thereto to precipitate lithium carbonate.

The precipitated lithium carbonate may be separated from the resulting lithium-depleted solution by conventional separation techniques, such as filtration, gravity separation, decantation, centrifugation and so forth.

Separated lithium carbonate may be converted to lithium hydroxide by dissolving the separated lithium carbonate in water or an aqueous solution to produce a lithium carbonate solution and adding lime to the lithium carbonate solution. Lithium hydroxide may be precipitated as a solid by evaporation.

EXAMPLE

The invention is further illustrated by the following examples. The examples are provided for illustrative purposes only. They are not to be construed as limiting the scope or content of the invention in any way.

Example 1

One specific embodiment of the process will now be described with reference to the accompanying FIGURE.

Spodumene (ROM) was mixed with a hydrofluoric acid (HF) in conc. sulphuric acid ($H_2SO_4$) to achieve a target HF concentration of 4-15% w/w. The mixture was heated to 90° C. for 4 h.

Water was added to the mixture in a water:spodumene ratio of 10:1 and heated to 90° C. for 1 h. The resulting leach mixture was filtered and lime was added to the filtrate to elevate the pH in a step-wise fashion to a pH corresponding to formation and precipitation of aluminium hydroxides and silica.

The precipitated solids were separated by filtration to produce a lithium sulphate solution.

Li extraction was 92.3%, Al extraction was 90% and Si extraction was 86%.

The lithium sulphate solution was further treated with sodium carbonate to precipitate lithium carbonate.

The lithium carbonate precipitate was filtered from the solution, redissolved and converted to lithium hydroxide by addition of lime.

Example 2

A sample of lepidolite ore was progressively ground in a rod mill to yield a $P_{100}$<150 µm sample. Particle size distribution (PSD), as determined by laser sizing, showed that the sample possessed a $P_{80}$100 µm and displayed a relatively monotonic PSD centred at ~80-90 µm.

Partial dissolution of the sample was performed at 90° C. in 2 L polypropylene beakers with PVC baffled inserts. Sulphuric acid solution with the target concentration was added to the beaker and once the temperature set point was achieved, the required dose of calcium fluoride ($CaF_2$) was added. After allowing the fluoride to react with the sulphuric acid solution for 10 minutes, the lepidolite sample was added.

At the conclusion of the dissolution, the slurry was filtered hot (>90° C.) and washed on the filter three times with hot 100 g/L $H_2SO_4$ (or just below acid concentration for tests performed at lower acid concentration) and finally with deionised water. Solids were dried at 105° C. and submitted for assay by digest/ICP-OES for Li and by XRF for all other elements.

High Acid/Low Fluoride Conditions

Several samples as prepared above were reacted with 500 g/L $H_2SO_4$, 140 kg/t $CaF_2$ at 90° C. for 8 h at 20 wt % solids. The addition of acid ranged between 2300-2700 kg/t, with consumption ranging between 900-1100 kg/t. Under these reaction conditions, extraction of lithium was 94-96%.

Decreasing the $CaF_2$ addition to 90 kg/t at 500 g/L $H_2SO_4$ decreased the extraction of Li considerably to 84%, demonstrating the significant role that F plays on the dissolution of lepidolite ore and that a higher $CaF_2$ addition is required to ensure maximum Li extraction.

Similar Li extraction of 94-96% was obtained by reducing the sulphuric acid concentration to 300-400 g/L with $CaF_2$ addition in the range 90-140 kg/t.

Low Acid/High Fluoride Conditions

Several samples as prepared above were reacted with 20-100 g/L $H_2SO_4$, 250-350 kg/t $CaF_2$ at 90° C. for 24 h at 15 wt % solids. At 20 g/L $H_2SO_4$, the extraction of Li was 87% compared to Li extractions of 97 and 99%, respectively for acid concentrations of 50 and 100 g/L.

Three further tests were performed for 8 h at increased solids content of 20 and 25 wt % with between 50-100 g/L target acid concentration. Extraction of Li at the reduced residence time was considerable lower (87%) with 50 g/L $H_2SO_4$ compared with Li extractions of 94-95% with 100 g/L $H_2SO_4$.

Due to the very high total dissolved solids (TDS) of the PLS following dissolution at 20-25 wt % solids, it was necessary for the resultant slurry, both before and after solid/liquid separation, to be maintained at a temperature >70° C. The resultant filtrate was maintained at a temperature >60° C. It will be appreciated by persons skilled in the art that any resultant precipitate may be redissolved upon re-heating the filtrate or by dilution of the PLS immediately after treatment with acid and fluoride.

Lithium may be successfully extracted from the lepidolite sample under low acid/high fluoride conditions as described above. Under these conditions acid addition and consumption may be reduced. However, preferred conditions for extraction of lithium involve high acid/low fluoride conditions as described above, which consistently achieve high Li extractions whilst minimising Si tenors in the PLS. Additionally, the lower fluoride concentration result in a lower likelihood of free HF forming and potentially minimises Li losses downstream as LiF or [$(Li/Na)_3AlF_6$] precipitates.

Impurity Removal—Downstream Purification

Removal of impurities from the PLS was achieved by step-wise elevation to pH 10.5-11.0 at a temperature between 70-90° C., using lime or a combination of limestone or lime. The precipitation of Li during pH elevation is closely related to the precipitation of Al and fluoride. Aluminium and fluoride precipitate as $AlF^{2+}$ and/or $AlF_2^+$ species between pH 3.0 and 4.5, with a pH 5.0 required for complete rejection. However, if the pH is raised too quickly, then excessively high Li precipitation occurs leading to lower Li recovery rates downstream.

Therefore, in order to minimise Li losses it was necessary for the pH to be increased incrementally in two stages. The pH was first elevated to pH<4, in particular pH 3.5-3.9 to precipitate a majority of Al and fluoride from the PLS and minimise overall Li losses to <10% following elevation of the PLS to pH 11.

In general, once the concentration of fluoride in the PLS is reduced to ~2 g/L the pH can be increased to 10.5-11.0 with only minor (≤1%) losses of Li. Some calcium sulphate (as gypsum and basanite) also incorporating K, Rb and Cs, probably by isomorphic substitution, may also form.

Following elevation of the pH of the PLS to pH 10.5-11.0, the PLS was subjected to a softening step whereby a stoichiometric amount or a stoichiometric excess of sodium carbonate was added to bulk remove Ca as calcium sulphate precipitate and to achieve a solution concentration of Ca<50 mg/L. The stoichiometric amount of sodium carbonate added to the PLS in the softening step may be from 100-150 mol %. The calcium sulphate precipitate was subsequently removed by filtration.

The resulting PLS filtrate was evaporated to either a target Li concentration of 13 g/L or a target K concentration of 65-70 g/L to promote potassium sulphate crystallisation. The evaporated PLS filtrate may also be cooled to <10° C. to precipitate potassium sulphate and sodium sulphate, which are removed by filtration. It is important to reduce the concentration of potassium in the PLS as elevated K concentrations increase the solubility of Li.

Lithium carbonate precipitation was facilitated by addition of sodium carbonate in a stoichiometric amount or a stoichiometric excess (105-150%) at 95° C. to decrease the residual Li concentration to ~1.6 g/L.

The resultant supernatant underwent a second evaporation step to remove water, targeting a K concentration of from 40-70 g/L and the resulting solution was cooled to <10° C. to precipitate potassium sulphate and sodium sulphate.

The composition of the resulting $Li_2CO_3$ products were >98% with the major impurities being $K_2SO_4$, $Na_2SO_4$ and $Li_2SO_4$.

Example 3

A sample of spodumene mineral concentrate was dried at 110° C. and milled to achieve $P_{80}$ less than 45 μm. The PSD, as determined by laser sizing, showed that the sample possessed a $P_{90}$ from 35-50 μm, a $P_{80}$ from 24-30 μm and a $P_{50}$ from 10-20 μm.

Partial dissolution of the sample was performed at 90° C. in a 0.5 L Azalon PMP-TQX beakers without baffles and equipped with a Teflon agitator and overhead stirrer. Sulphuric acid solution with the target concentration was added to the beaker and once the temperature set point was achieved, the required dose of hydrofluoric acid (HF) was added.

At the conclusion of the dissolution, the slurry was filtered hot (>60-70° C.) and washed on the filter three times with water only. Solids were dried at 105° C. and submitted for assay by digest/ICP-OES for Li and by XRF for all other elements.

HF/$H_2SO_4$ Conditions

Several samples as prepared above were reacted with $H_2SO_4$ (1000, 700 and 500 kg/t) and 1000 kg/t HF at 90° C. for 3 h at 15 wt % solids. Under these reaction conditions, extraction of lithium was 80%. Hydrofluoric acid is a preferred source of fluoride over calcium fluoride with in-situ generation of HF because all the added fluoride is available as HF which is required to attack the spodumene lattice.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Example 4

An additional test was performed under the following conditions in a pilot plant: 400 g/L $H_2SO_4$, 250 kg/t $CaF_2$, 95° C., 20 wt % solids.

As received wet feed lepidolite ore ($P_{80}$<180 μm) was mixed with calcium fluoride batchwise in a make-up tank to target a solids density of 37 wt %, which was subsequently fed batchwise to a solids feed tank, at ambient temperature. The moisture content of the ore sample and therefore the amount of calcium fluoride required for the target $CaF_2$ addition, was estimated based on an average moisture composition of samples taken from a number of wet ore buckets.

The slurry was then fed to a series of four polypropylene 50 L tanks, controlled at temperature by electrical immersion heaters. Concentrated sulphuric acid was fed to the first tank only, resulting in a target solids density of 22-25 wt %. the exothermic reaction of the acid addition maintained the temperature in the first tank >90° C., and therefore a water cooled immersion coil was employed to maintain the temperature at approximately 95° C.

The initial target residence time in the first four tanks was 12 hours. The slurry was pumped to a fifth tank (also controlled at 95° C.), where it was diluted to 15 wt % solids with hot water, to avoid possible gelling of the liquor due to the high TDS (in particular aluminium sulphate).

The slurry was then fed to a filter feed tank controlled to <80° C., before filtration in a plate and frame filter press, with the solids washed with hot water (~75° C.) at a target wash ratio of 1.3 L/kg. Following filtration, the solids were collected and drummed, with the primary filtrate and washate sent forward to Impurity Removal stage 1.

Overall lithium extraction was 95.1% and lithium recovery to liquor was 83% over the campaign.

The Impurity Removal stage 1 circuit consisted of four jacketed 20 L SS tanks, initially maintained at a target temperature of 70° C. Leach filtrate (including washate) was fed to the first tank, with limestone slurry added to the first two tanks. The limestone slurry was about 30 wt % and the target residence time for the IR1 circuit was nominal 2 h.

The pH of the fourth tank was generally maintained in the range of 3.5-4.0 as targeted.

The slurry overflowing from the fourth tank was fed to a filter feed tank, with the slurry then filtered using a plate and frame filter press and washed with water at a target wash ratio of 1.3 L/kg. The primary filtrate and washate were then transferred to Impurity Removal stage 2.

The vast majority of solids produced were gypsum with some aluminium and fluoride present, from neutralisation of the acid in the leach liquor. The limestone addition was 271 g/L and the solids production was 4334 g/L of feed liquor. In addition to Al and F, significant precipitation of Fe (65.4%) occurred. Precipitation of smaller proportions of Cs, Rb, and K and Na was also observed. The precipitation of the Group I alkali earth metals in this pH range is attributed to the presence of fluoride in the liquor.

The Impurity Removal stage 2 circuit consisted of two jacketed 20 L stainless steel tanks maintained at a target temperature of 60° C. with IR primary filtrate and washate and lime slurry (20-25 wt %) added to Tank 1, to target pH 10.5-11.0 in Tank 2. The residence time in the tanks was about 1 h.

Slurry exiting the second tank was fed to a thickener and dosed with a 0.025 wt % solution of M10 flocculant at a dose of 376 g/t of precipitate. The flocculated slurry was fed through the thickener and the entire slurry was filtered. No thickener overflow was collected. Following filtration, the filtrate and washate were forwarded to the softening circuit.

Collected solids were predominantly gypsum with more aluminium and fluoride present. Lithium precipitation was 6.4% via the overall balance. The extent of Li precipitation correlated strongly with the concentration of Al in the feed liquor to the circuit, increasing from 2% at 1.3 g/l Al to 8% at 5.1 g/L Al.

The rejection of Al, Fe, Mg, Mn and F was extremely high, with >98% precipitation occurring overall.

Softening circuit consisted of two 30 L HDPE tanks maintained at around 50° C. Residence time in the circuit was 1.3 hours. Sodium carbonate solution (150 g/L) was pumped to the first tank, with the overflow from the second tank fed to a thickener and dosed with M333 flocculent.

Precipitated carbonate solids were recycled to the IR Stage 1 circuit. Excess carbonate addition did not result in precipitation of lithium carbonate. The majority of residual Al in solution was also removed in softening.

The Evaporation Circuit consisted of four pan evaporators, three of which were on line at any one time. The evaporators were used to evaporate softened liquor or a combination of softened and recycled barren liquor batchwise to target a lithium concentration of ~9-10 g/L in the concentrate before feeding to the potassium sulphate precipitation circuit.

The Potassium Sulphate Precipitation circuit consisted of two chilled jacketed 7.2 L tanks. Feed liquor from the evaporation stage were chilled which resulted in saturation and crystallisation of K and Na sulphate. The slurry overflowed continuously from the second tank onto a vacuum filter. The filtrate and washate were brought forward batchwise to the lithium carbonate precipitation circuit.

The Lithium Carbonate Precipitation circuit consisted of two jacketed 3.6 L tanks heated to a target temperature of 90-95° C. Sodium carbonate solution (200 g/L) was dosed to the first tank. The solids overflowing from Tank 2 were immediately filtered on a vacuum filter. Filter cakes were collected every 12 h and washed with 2 L/kg of hot (>80° C.) saturated lithium carbonate solution. The filtrate and washate were recycled to the evaporation circuit. Lithium recoveries averaged 61% and 62%.

The invention claimed is:

1. A process for extracting lithium values from a lithium-bearing material comprises the steps of:
    a) heating an aqueous slurry comprising a lithium-bearing material, water, 40 to 2000 kg/t of a source of fluoride and 50 to 5000 kg/t sulphuric acid at a temperature from 70° C. up to the boiling point of the aqueous slurry at atmospheric pressure and for a period of time from 4 h to 24 h; and,
    b) washing the aqueous slurry with water or a dilute acid solution and separating solids therefrom to produce a lithium-bearing solution (LBS).

2. The process according to claim 1, wherein the slurry has a solids density in a range of 15-50 wt %.

3. The process according to claim 2, wherein the slurry has a solids density in the range of 20-25 wt %.

4. The process according to claim 1, wherein the source of fluoride comprises a fluoride salt, hydrofluoric acid, or a fluoride-bearing substance which generates hydrofluoric acid by reaction with sulphuric acid.

5. The process according to claim 1, wherein the slurry comprises 40-2000 kg/t of the source of fluoride.

6. The process according to claim 5, wherein the slurry comprises 90-1400 kg/t of the source of fluoride.

7. The process according to claim 1, wherein the slurry comprises 500 to 2000 kg/t of the source of fluoride.

8. The process according to claim 1, wherein the slurry comprises 50-100 kg/t sulphuric acid.

9. The process according to claim 7, wherein the slurry comprises 500-5000 kg/t sulphuric acid.

10. The process according to claim 1, wherein the lithium-bearing material comprises a lithium-bearing silicate.

11. The process according to claim 10, wherein the slurry comprises a lithium-bearing mica, 90-1000 kg/t source of fluoride and 50-300 kg/t sulphuric acid.

12. The process according to claim 10, wherein the slurry comprises spodumene, 500-2000 kg/t source of fluoride and 1000-5000 kg/t sulphuric acid.

13. The process according to claim 1, wherein the slurry is heated from 90° C. up to the boiling point of the slurry at atmospheric pressure.

14. The process according to claim 1, wherein Li extraction from the lithium-bearing material is >85%.

15. The process according to claim 14, wherein Li extraction from the lithium-bearing material is >98%.

16. A process for recovering lithium values as lithium carbonate from a lithium-bearing material comprising the steps of:
    a) extracting lithium values from the lithium-bearing material to produce a lithium-bearing solution according to claim 1;
    b) removing one or more impurities from the lithium-bearing solution (LBS); and,
    c) evaporating the LBS produced in step b) to precipitate lithium carbonate.

17. The process according to claim 16, wherein the step of removing one or more impurities from the LBS comprises raising the pH of the LBS to 3.5-4.0 to deplete the LBS of fluoride and subsequently raising the pH of the fluoride-depleted LBS to 10.5-11.0 to precipitate one or more remaining impurities therefrom.

18. The process according to claim 17, wherein one or more precipitates containing fluoride are separated from the fluoride-depleted LBS and recycled for use as a source of fluoride in the process for producing the LBS.

19. The process according to claim 17, wherein the concentration of fluoride in the LBS is reduced to about 2 g/L before raising the pH of the fluoride-depleted LBS to 10.5-11.0.

20. The process according to claim 17, wherein raising the pH comprises adding a source of carbonate to the LBS.

21. The process according to claim 20, wherein the source of carbonate is selected from a group comprising an alkali metal carbonate salt, an alkaline earth metal carbonate salt, or carbon dioxide under alkaline conditions.

22. The process according to claim 16, wherein step c) comprises evaporating the LBS produced in step b) until a Li concentration in a range of about 2.8 g/L 10 g/L is achieved.

23. The process according to claim 16, wherein prior to performing step c), the process further comprises the step of softening the LBS from step b).

24. The process according to claim 23, wherein softening comprises adding at least a stoichiometric amount of sodium carbonate to bulk remove calcium as calcium sulphate.

25. The process according to claim 24, wherein the process further comprises removing potassium sulphate and/or sodium sulphate from the LBS prior to performing step c).

26. A process for recovery of lithium values as lithium hydroxide, the process comprising the steps of:
   a) recovering lithium values from a lithium-bearing material according to claim 16;
   b) dissolving separated lithium carbonate in water or an aqueous solution to produce a lithium carbonate solution, adding lime to the lithium carbonate solution; and
   c) precipitating lithium hydroxide by evaporation.

27. The process of claim 1, wherein any reaction gas produced during step a) is substantially free of dust and/or fluoride species.

* * * * *